(12) United States Patent
Elizondo

(10) Patent No.: US 6,805,005 B1
(45) Date of Patent: Oct. 19, 2004

(54) DEVICE FOR INCREASING AND MEASURING THE SPEED OF A GOLF, TENNIS OR BATTING SWING

(76) Inventor: Juan C. Elizondo, 325 S. 127th St., Omaha, NE (US) 68154

( * ) Notice: Subject to any disclaimer, the term of this patent is extended or adjusted under 35 U.S.C. 154(b) by 0 days.

(21) Appl. No.: 10/179,702

(22) Filed: Jun. 24, 2002

Related U.S. Application Data

(60) Provisional application No. 60/322,785, filed on Sep. 17, 2001.

(51) Int. Cl.$^7$ ............................ G01P 15/04; A63B 69/00
(52) U.S. Cl. ............................ 73/488; 73/492; 473/219
(58) Field of Search ........................ 73/488, 492, 493, 73/379.01, 379.02; 473/219, 457, 489, 263; D21/791

(56) References Cited

U.S. PATENT DOCUMENTS

| | | |
|---|---|---|
| 1,712,609 A | 5/1929 | Gibson |
| D118,594 S | 1/1940 | Heddon |
| 2,223,647 A | 12/1940 | Stumpf |
| 2,244,972 A | 6/1941 | Stumpf |
| 2,543,722 A | 2/1951 | Hetzel |
| 2,986,937 A | 6/1961 | Chapman |
| 3,561,272 A | 2/1971 | Davis |
| 4,270,753 A | 6/1981 | Maroth et al. |
| 4,363,488 A | 12/1982 | Maroth et al. |
| 4,614,343 A | 9/1986 | Radway |
| 4,878,672 A | 11/1989 | Lukasiewicz |
| 4,967,596 A | 11/1990 | Rilling et al. |
| D356,359 S | 3/1995 | Bailey |
| 5,405,139 A | 4/1995 | Gagarin |
| 5,520,049 A | 5/1996 | Butler, Jr. |
| 5,590,875 A * | 1/1997 | Young ........................ 473/451 |
| 5,841,029 A | 11/1998 | Luking |
| 5,868,634 A | 2/1999 | Choi et al. |
| 5,989,131 A | 11/1999 | Burkholder |
| D417,479 S | 12/1999 | Mechals, Jr. |
| 6,186,904 B1 * | 2/2001 | Bass ........................ 473/219 |
| 6,280,353 B1 * | 8/2001 | Brundage .................... 482/57 |
| 6,569,042 B2 * | 5/2003 | LaChance et al. .......... 473/457 |
| 2002/0094888 A1 * | 1/2001 | LaChance et al. .......... 473/457 |

\* cited by examiner

*Primary Examiner*—Hezron Williams
*Assistant Examiner*—Jacques M. Saint-Surin
(74) *Attorney, Agent, or Firm*—Thomte, Mazour & Niebergall; Dennis L. Thomte

(57) ABSTRACT

A device for increasing and measuring the speed of a golf, tennis or batting swing comprising an elongated, hollow metal tube having a gripping portion provided at one end thereof. A swing speed or velocity indicator is positioned in the other end of the tube with the scaled thereof being visible through a slot formed in the wall of the tube.

12 Claims, 1 Drawing Sheet

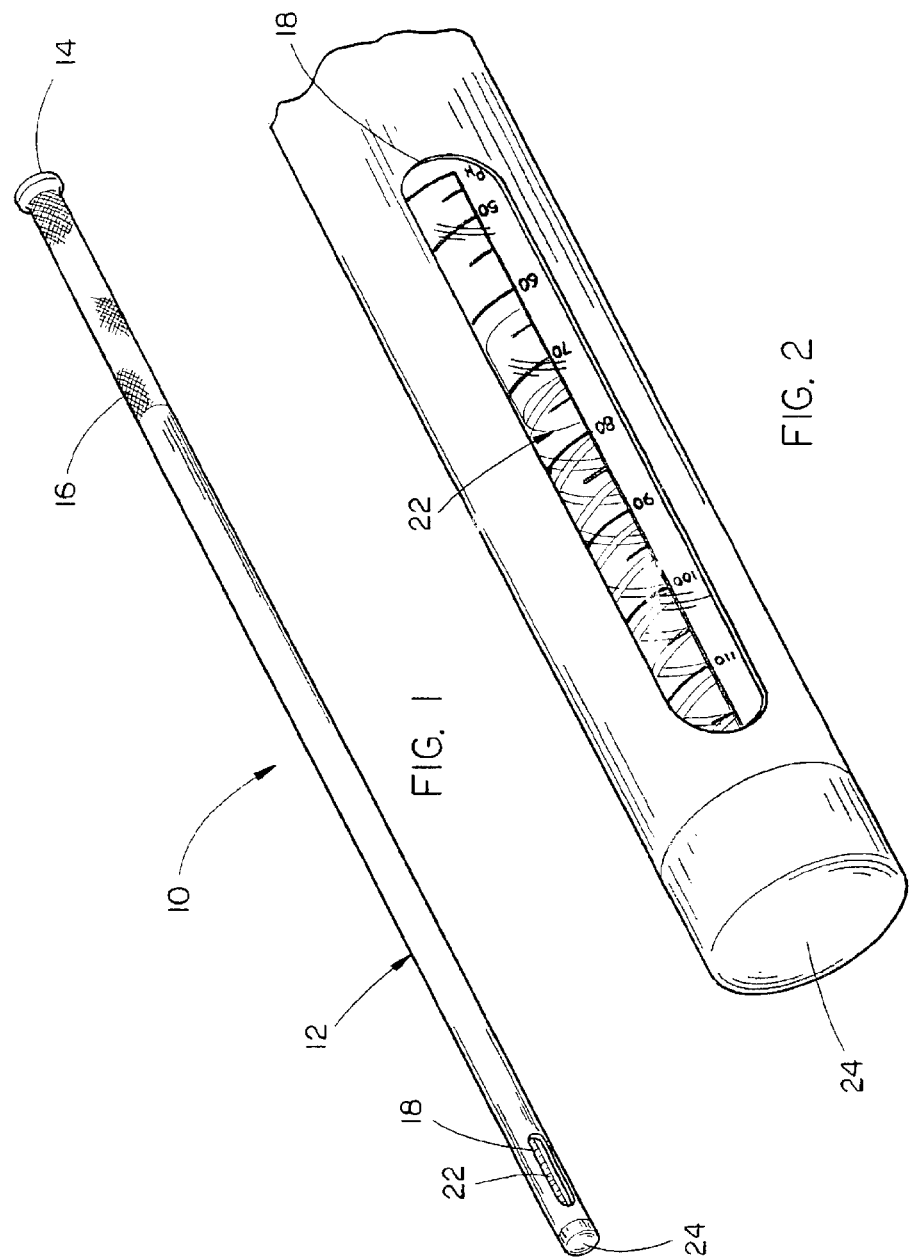

DEVICE FOR INCREASING AND MEASURING THE SPEED OF A GOLF, TENNIS OR BATTING SWING

CROSS-REFERENCE TO RELATED APPLICATION

This application claims the benefit of U.S. Provisional Application Ser. No. 60/322,785 entitled A DEVICE FOR INCREASING AND MEASURING THE SPEED OF A GOLF, TENNIS OR BATTING SWING filed Sep. 17, 2001, the disclosure of which is hereby incorporated herein by reference.

BACKGROUND OF THE INVENTION

1. Field of the Invention

This invention relates to a device for increasing and measuring the speed of a golf swing, tennis swing or batting swing. More particularly, the invention relates to an elongated metal tube having a swing speed or velocity indicator mounted therein at one end thereof opposite to the gripping portion of the device.

2. Description of the Related Art

Most golfers want to hit the golf ball with more power, harder and farther. It is well-known that the faster you swing the golf club, the farther you will hit the ball. In an effort to increase swing speed, many devices have been previously provided. One type of device is a weighted club. Another type of prior art device is a weight which may be attached to the club head of the golf club. Still another device is a heavy ring which is slipped over the shaft of the golf club in an effort to provide a heavier practice club. Although all of the prior art devices are believed to have some merit, it is believed that improvements may be made therein and that is the purpose of this invention.

SUMMARY OF THE INVENTION

A device for increasing and measuring the speed of a golf swing, tennis swing or batting swing is disclosed which comprises an elongated, hollow metal tube weighing approximately 1 to 2 pounds and which is approximately 45 inches in length with a diameter of slightly over 1 inch. A serrated gripping portion is provided at one end of the tube with the tube being provided with a knob at the gripping end of the tube to prevent the users hands from slipping therefrom. A swing speed or velocity indicator such as disclosed in U.S. Pat. No. 4,967,596 is positioned in the other end of the tube with the scale thereof being visible through a slot formed in the wall of the tube. The user swings the tube much like a baseball swing and follows a practice routine or schedule thereby increasing the user's speed of a golf, tennis or batting swing.

It is therefore a principal object of the invention to provide an improved device for increasing and measuring the speed of a swing, such as golf, tennis or baseball.

Still another object of the invention is to provide a device of the type described which has a diameter sufficient to create wind resistance as the device is swung through the air.

Still another object of the invention is to provide a device such as described above which has sufficient weight and length which will increase the speed of the user's golf swing.

These and other objects will be apparent to those skilled in the art.

BRIEF DESCRIPTION OF THE DRAWINGS

FIG. 1 is a perspective view of the device; and

FIG. 2 is a partial perspective view of the device.

DESCRIPTION OF THE PREFERRED EMBODIMENT

The numeral 10 refers to the device of the invention which is designed to increase and measure the speed of a golf, tennis or batting swing. Device 10 comprises an elongated, cylindrical, hollow tube 12 having a knob 14 at the grip end thereof. Preferably, the tube 12 has a serrated gripping surface 16 provided thereon to prevent the user's hands from slipping therefrom during usage thereof. The tube is preferably constructed of a metal material for durability purposes and for providing the necessary weight to the device. Preferably, the tube 12 is approximately 45 inches long and has a diameter of slightly more than 1 inch and weighs between 1 and 2 pounds.

Tube 12 is provided with an elongated opening 18 formed therein adjacent the end opposite to knob 14 to permit the user to visually observe the swing speed scale 20 of a swing speed or velocity indicator 22 which is preferably built in accordance with the teachings of U.S. Pat. No. 4,967,596. The indicator 22 is held in place within the tube 12 by means of rivets or screws. The end of the tube 12 is closed by means of a cap 24 which is held in position by rivets or screws.

In use, the user grasps the gripping surface 16 with both hands using a ten-finger grip. The user swings the device in a horizontal manner similar to a baseball swing. The weight of the device 10 as well as the wind resistance of the relatively large diameter tube 12 enables the user to experience the power of a swing motion that is controlled by centrifugal force and enables the user to experience the feeling of dynamic motion in balance. Repeated swings of the device 10 while following a prescribed routine will strengthen the muscles used in the golf swing and will increase the overall flexibility of the user. The indicator 22 provides a method of measuring the speed of the swing and a method of measuring the progress of the user. It has been found that persons who practice swinging the device 10 according to a prescribed routine will dramatically increase their swing speed, thereby enabling the person to hit a golf ball further than prior to practicing with the device.

Thus it can be seen that the invention accomplishes at least all of its stated objectives.

What is claimed is:

1. A device for increasing and measuring the speed of a golf, tennis or batting swing, comprising:

an elongated member having a hand grip end and an opposite end; said elongated member having a cylindrical portion with a substantially constant diameter extending from said hand grip end to said opposite end;

said elongated member having a swing speed measuring device provided therein at said opposite end;

said elongated member having an elongated opening formed therein adjacent its said opposite end through which said swing speed measuring device is visible.

2. The device of claim 1 wherein the diameter of said elongated member is approximately 1 inch in diameter.

3. The device of claim 1 wherein said elongated member is approximately 45 inches long.

4. The device of claim 1 wherein said elongated member is comprised of a metal material.

5. The device of claim 1 wherein said elongated member has a knob provided thereon at its hand grip end.

6. The device of claim 1 wherein a gripping surface is provided on said hand grip end of said elongated member.

7. The device of claim 6 wherein said gripping surface is serrated.

8. A device for increasing and measuring the speed of a golf, tennis or batting swing, comprising:

an elongated member having a hand grip end and an opposite end; said elongated member having a cylindrical portion with a substantially constant diameter extending from said hand grip end to said opposite end;

said elongated member having a swing speed measuring device provided therein at said opposite end.

9. The device of claim 8 wherein said swing speed measuring device is visible to the user.

10. The device of claim 8 wherein said elongated member is hollow.

11. The device of claim 10 wherein said elongated member is comprised of metal.

12. The device of claim 9 wherein said swing speed measuring device is visible through an opening formed in said elongated member.

* * * * *